United States Patent [19]

Wells

[11] Patent Number: 5,051,559
[45] Date of Patent: Sep. 24, 1991

[54] NOZZLE FABRICATION TECHNIQUE

[75] Inventor: Dennis L. Wells, League City, Tex.

[73] Assignee: The United States of America as represented by the Administrator of the National Aeronautics and Space Administration, Washington, D.C.

[21] Appl. No.: 358,029

[22] Filed: May 26, 1989

Related U.S. Application Data

[62] Division of Ser. No. 176,587, Apr. 1, 1988, Pat. No. 4,852,232.

[51] Int. Cl.$^5$ ............................................. B23K 26/00
[52] U.S. Cl. ................................. 219/121.72; 29/558; 219/69.12
[58] Field of Search ........... 219/69.12, 121.67, 121.72, 219/121.68, 121.65, 121.7, 121.71, 121.85; 82/1.11, 11, 12, 146; 83/74

[56] References Cited

U.S. PATENT DOCUMENTS

| | | | |
|---|---|---|---|
| 3,566,722 | 3/1971 | Audet | 82/12 |
| 4,010,345 | 3/1977 | Banes et al. | 219/121.67 X |
| 4,601,224 | 7/1986 | Clark, III | 83/74 |
| 4,852,232 | 8/1989 | Wells | 219/69.12 |

Primary Examiner—C. L. Albritton
Attorney, Agent, or Firm—Russell E. Schlorff; Harold W. Adams; Edward K. Fein

[57] ABSTRACT

A block of electrically-conductive material which is to be formed into a body with internal and/or external surfaces that approximate hyperboloids of one sheet is placed so that its axis is set at a predetermined skew angle with relation to a travelling EDM electrode wire and the electrode wire is then moved into cutting proximity of the body wire. Thereafter, by revolving the body about its own axis, the external and/or internal surfaces of the body will be cut into an approximate hyperbolic surface of revolution depending upon whether the body is positioned with the cutting wire outside of the body or in a previously-formed longitudinal passage in the body. As an alternative technique, elongated channels can also be cut into the walls of the body of successively orienting the body to a selected number of angular positions with the electrode wire being either outside of the body or in a previously-formed passage in the body. At each of these angulr positions, the electrode wire is moved orthogonally with respect to the axis of the wire while both the body axis skew angle and the rotational position about that axis is controlled for cutting a channel or groove in the body as required to relieve stresses in the material of the body or to convey a coolant fluid.

18 Claims, 3 Drawing Sheets

NOZZLE FABRICATION TECHNIQUE

ORIGIN OF THE INVENTION

The invention described herein was made by an employee of the U.S. Government and may be manufactured and used by or for the Government of the United States of America for governmental purposes without the payment of any royalties thereon or therefor.

This is a division of application Ser. No. 07/176,587, filed 04/01/88 now U.S. Pat. No. 4,852,232.

Background of the Invention

1. Field of the Invention

Rocket thrusters are commonly used to control the flight attitude and velocity of both manned and unmanned spacecraft while in flight as well as for carrying out various maneuvers of the spacecraft.

This invention relates to techniques for fabricating the nozzles used in such rocket thrusters. More particularly, the present invention relates to new and improved fabrication techniques for forming rocket thruster nozzles from electrically conductive materials as well as for cutting cooling channels in the internal walls of the nozzles.

2. Background Art

Heretofore the nozzles for rocket thrusters have been fabricated with conventional mechanical cutting or grinding tools. Since these nozzles are typically subjected to extreme gas temperatures in the order of 6,000-degrees F., it is preferred to use heat resistant materials such as sintered carbides or refractory metals. However, since these materials have very high hardnesses, are brittle and otherwise difficult to form, it is difficult and expensive to manufacture these nozzles. One common practice used heretofore has been to employ various molding, casting or forging techniques for forming these heat resistant materials into suitable nozzle shapes. Nevertheless, with even the best forming techniques, these nozzles require considerable grinding and machining to properly shape their critical internal surfaces.

As explained, for example, in U.S. Pat. No. 4,639,568, another technique for forming precision nozzles employs a specially-shaped cold-forming punch to initially shape the frustoconical interior portion of a nozzle. The nozzle is then completed by utilizing a so-called "EDM" or electron discharge machine which has a frustoconical electrode that is coaxially positioned in the previously-formed cavity and the EDM machine is operated to precisely form the wall surfaces without contacting the nozzle walls.

U.S. Pat. No. 4,069,978 discloses a similar technique for forming offset passages which are inclined in relation to the central bore of the nozzle. After the central bore is formed, an inclined pilot hole is drilled completely across the nozzle body and appropriately directed so as to intersect the central bore. An elongated EDM electrode is then positioned in the pilot hole and operated to enlarge and shape one portion of the pilot hole as needed for defining an offset passage in one side of the nozzle body extending between the central nozzle bore and the exterior of the nozzle body. Once this offset passage has been properly shaped, the electrode is withdrawn and the unwanted portion of the pilot hole in the other side of the nozzle body is permanently plugged with a metal plug.

In another fabrication technique which is described in U.S. Pat. No. 4,508,604 and U.S. Pat. No. 4,578,556, a work piece is mounted on a work table which is adapted to be moved along orthogonal X-Y axes by a pair of electric motors that are controlled by a numerical control unit which is programmed for moving the work piece along a predetermined path in the X-Y plane. Once the work piece has been mounted on the table, a longitudinally-movable EDM wire electrode is positioned in a previously-formed hole in the work piece. Thereafter, as the the work piece is being transported along the X-Y plane, the forward edge of the vertically-moving electrode element will be progressively cutting away the adjacent vertical surfaces of the work piece. In this way, during the cutting operation, the hole in the work piece will be progressively enlarged and shaped in accordance with the programmed cutting pattern of the numerical control unit.

It will, of course, be appreciated by those skilled in the art that despite the aforementioned advances in the prior art, it has not been considered possible heretofore to efficiently employ these prior-art techniques for fabricating the nozzles for rocket thrusters from heat resistant materials such as the materials mentioned above. For example, the use of an EDM electrode that is specially shaped to form the throat portion of a thruster nozzle is not particularly efficient since the electrode tends to spall the adjacent surfaces of the nozzle throat. On the other hand, since a typical travelling-wire EDM machine such as shown in the aforementioned patent is limited to cutting only along the Z-axis and the work piece is movable only in the X-Y plane, apparently it has not been considered possible to use these EDM machines for cutting the diverging and converging surfaces of a thruster nozzle.

Moreover, in view of the extreme operating temperatures typically experienced with rocket propellants, it is preferred to provide a plurality of circumferentially-spaced channels in the internal walls of these nozzles through which a coolant or some of the rocket propellant will be passed for cooling the nozzles during their operation. It will be appreciated, of course, that with typical thruster nozzle materials, it is no simple task to precisely form a group of small cooling channels in the walls of these nozzles. More particularly, it should also be realized that the size and shape as well as strength of any cutting tool being used to cut the cooling channels will limit their size, shape and locations. It should also be noted that if a typical EDM machine with a longitudinally-movable electrode is used to cut the cooling channels, the geometry of the nozzles will ordinarily result in these channels being cut at varying depths into the wall of a nozzle. The resulting thickness variations of the remaining material in the nozzle wall will often result in uneven or inefficient cooling of the wall as well as produce serious thermal stresses in the nozzle when the thruster is operated. Accordingly, it is believed that it is not particularly effective to employ these prior-art fabricating techniques either for shaping the internal contour of a thruster nozzle or for forming a plurality of intricate cooling channels in its internal walls.

SUMMARY OF THE INVENTION

Accordingly, it is an object of the present invention to provide new and improved fabricating techniques for forming intricate curved surfaces such as those preferably employed for thruster nozzles in a variety of materials.

It is a further object of the present invention to provide new and improved techniques to inexpensively shape the curved nozzle of a thruster which is being formed from electrically conductive materials such as sintered carbides or refractory materials.

It is another object of the present invention to provide a new and improved technique for efficiently cutting elongated channels in the internal walls of nozzles such as those used in rocket thrusters.

These and other objects of the invention are attained in the practice of the invention by positioning the surface of a body which is to be selectively cut away into cutting proximity of a cylindrical cutting device such as a longitudinally-movable EDM electrode wire. The body that is to be cut is then positioned until a selected axis of the body is skewed at a selected angle in relation to the longitudinal axis of the electrode wire; and the body and wire are then moved relative to one another while the EDM wire is travelling along its own longitudinal axis. In this manner, when this relative movement consists of rotation of the body about a selected axis, the EDM electrode wire will progressively cut away the contiguous portions of the body to leave a curved surface on the body approximating a hyperbolic shape. This new and improved cutting technique can be employed as desired for shaping either or both of the inner and outer surfaces of a body. In an alternative manner of practicing the invention, the EDM wire is positioned either outside or inside of a skewed body; and the wire is translated laterally relative to the body to cut a slot in the adjacent surface of the body. In addition, as the wire is translated laterally relative to the body, the skewed body can also be turned about its selected axis and the skew angle progressively changed so as to produce a desired cutting path in the body wall.

In a preferred embodiment of the new and improved methods of the invention, the EDM electrode wire is positioned within an opening through a body of a selected material so that as the body is revolved about the skewed axis, the body opening will be progressively cut so as to define an approximate hyperbolic configuration considered suitable for a thruster nozzle. Where the weight of the body is a consideration, the EDM electrode is positioned outside of the body and the new and improved methods of the invention are selectively employed by revolving the body about the skewed axis to progressively cut away and shape the outer surface of that body into an approximate hyperbolic configuration which is preferably substantially parallel to the internal configuration of the nozzle. In this preferred manner of practicing the invention, the electrode wire is positioned outside of the nozzle or within a pilot hole. The body is then moved laterally, rotated about its selected axis, and the skew angle is changed as required to progressively cut a cooling channel in the interior of the nozzle wall. If more than one cooling channel is desired, the nozzle body is appropriately repositioned and the process is repeated. The cooling channels can be cut in a programmed manner into the wall of the nozzle body so as to reduce thermal stresses when the thruster nozzle is in service as well as any residual stresses developed during the fabrication of the thruster.

BRIEF DESCRIPTION OF THE DRAWINGS

The several features of the present invention are set forth with particularity in the appended claims. The arrangement and practice of the invention, together with further objects and various advantages thereof, may best be understood by way of the following description of exemplary methods incorporating the principles of the present invention with typical apparatus for practicing these methods as illustrated in the accompanying drawings, in which:

DETAILED DESCRIPTION OF THE PREFERRED EMBODIMENT

Figure 1:
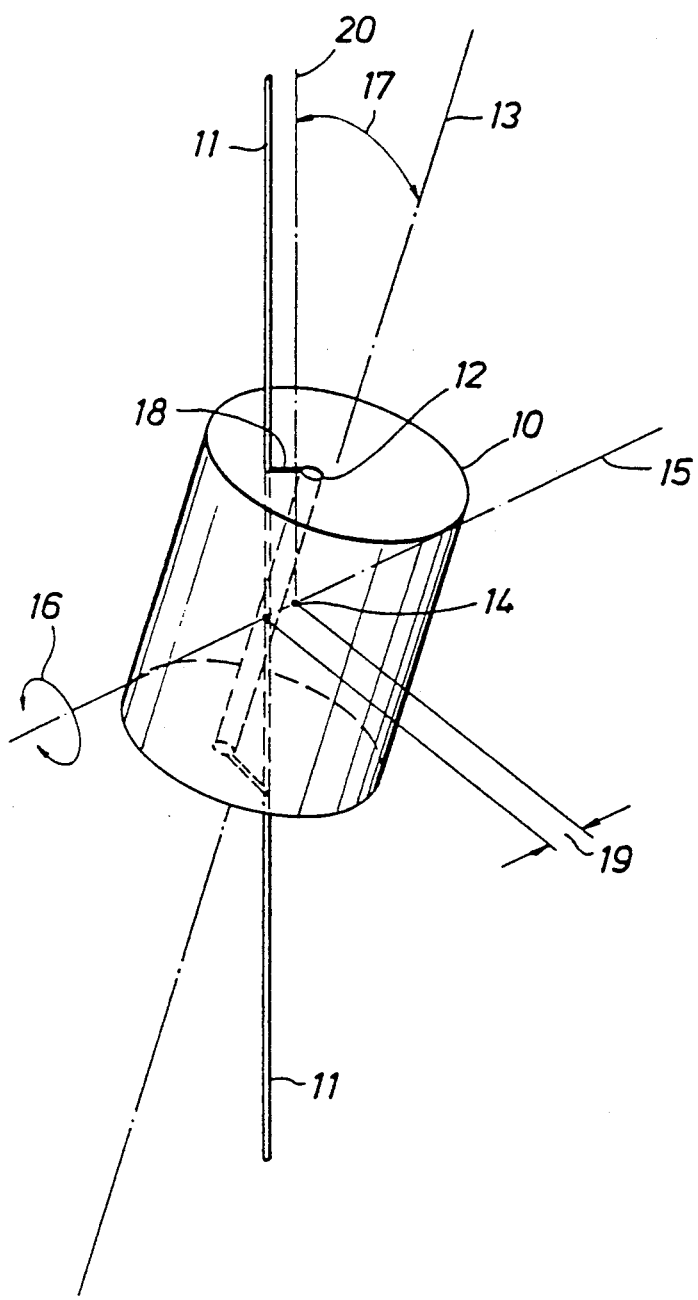
FIG. 1 is a schematic isometric view of a body which has been tilted at a predetermined skew angle in relation to the longitudinal axis of a typical travelling EDM electrode wire that was previously positioned and arranged in a passage that extends through the body in preparation for practicing the invention for enlarging and cooperatively shaping the passage upon rotation of the body around its own central axis.

Turning now to FIG. 1, an isometric view is shown of a body 10 which is to be selectively shaped in accordance with the principles of the invention by a typical EDM machine (not illustrated) such as shown in either U.S. Pat. No. 4,508,604 or U.S. Pat. No. 4,578,604 employing a longitudinally-moving electrode wire 11 that is tautly spanned between vertically-spaced supply and takeup reels (not illustrated) and adapted to be driven for electroerosively removing or cutting into the adjacent surface of a workpiece in response to the application of a machining voltage between the workpiece and the electrode wire. It will also be understood that the EDM machine includes positional devices appropriately arranged for translating the vertically-moving EDM electrode 11 along its orthogonal X-Y axes. As is typical with such EDM machines, these controlled translational movements are by means of a plurality of electric motors that are respectively controlled by a numerical control unit which is programmed as needed for selectively translating the EDM electrode wire 11 in the X-Y plane. It will be further appreciated that for practicing the present invention, one or more manually-operated or selectively-controlled fixtures of a conventional nature will be appropriately arranged as needed for cooperatively positioning and moving the body 10 in concert with the X-Y translation of the EDM electrode wire 11 so as to progressively cut away the adjacent surfaces of the body in a predetermined arrangement. Apparatus which is suitable for the practice of the invention is seen in Catalog No. 0886 of Daedal Inc. of Harrison City, Pa., titled "State-of-the-Art Positioning Equipment" and hereby incorporated by reference.

To describe one manner for practicing the new and improved methods of the present invention, the body 10 is depicted as having a longitudinal passage 12 which extends through the full length of the body. In accordance with the objects of the invention, the body 10 is a body of a selected material which is to be formed into a nozzle by using the new and improved methods of the invention. The body 10 may, of course, be of any convenient material, size and shape; but, as illustrated, it is preferred that the body is a cylindrical block of a selected electrically-conductive material with the longitudinal passage 12 extended either along or very close to the Z-axis or central longitudinal axis 13 of the body.

When the EDM machine is being set up, the body 10 is first placed in an upright position on the work table of the machine while the EDM electrode wire 11 is disposed in the longitudinal passage 12. Then, once the EDM machine has been started, the numerical control unit will then operate in accordance with its programmed cutting pattern to selectively tilt the body 10 in relation to the vertically-travelling EDM electrode wire 11 as well as to progressively and selectively translate the EDM wire in relation to a selected reference point 14 on the body. To better understand the invention, the program for the numerical control unit will utilize a body reference point 14 that is preferably defined as being located at the intersection of two of the orthogonal axes of the body 10 such as, for example, its Z-axis or central longitudinal axis 13 and its X-axis or so-called "skew axis" 15. During the cutting operation, the body 10 will always be positioned to maintain these axes 13 and 15 perpendicular to one another.

Since the body 10 is to be formed into a thruster nozzle having a generally-hyperbolic internal contour, as indicated by the arrow 16 the body is tilted around a transverse axis (such as the X-axis 15 of the body which perpendicularly intersects the longitudinal axis of the body at its reference point 14) to position the body at the desired skew angle 17. The numerical control unit also functions to progressively and selectively translate the EDM electrode wire 11 laterally in relation to the body reference point 14 thereby beginning an access cut 18 which, as seen in FIG. 1, extends to the depicted position of the electrode wire. The translation of the electrode wire 11 is halted when the center line of the wire is a predetermined lateral distance 19 from the body reference point 14 along the skew axis 15.

Once the cylindrical body 10 has been tilted to the position shown in FIG. 1, the body will then be at a skew angle 17 in relation to a vertical reference line 20 which is parallel to the EDM electrode wire 11 and intersects the body axis 13. In accordance with the principles of the invention, it has been found that by retaining the cylindrical body 10 at the same skew angle 17 while it is moved in relation to the moving EDM electrode wire 11 (such as by revolving the body about its own axis 13 as indicated at 21 in FIG. 2), the electrode will progressively cut away the contiguous portions of the body.

Then, once the body 10 has been turned through a full circle, it will be appreciated that the cutting action of the EDM wire 11 will have produced a curved surface of revolution 22 within the body 10 that closely approximates a hyperboloid of one sheet that is symmetric about the longitudinal axis 13. The cutting action will produce a loose central core (not shown in the drawings) representing the material in the middle of the body 10 between the surface of revolution 22. This loose core may be removed in some convenient fashion. It will, of course, be appreciated by those skilled in the art that the surface of revolution 22 will deviate slightly from a true mathematical hyperboloid of one sheet due to the width of the material that is removed by the electrode 11 and its associated electrical discharge. This internal surface of revolution 22 which is obtained in the practice of the present invention is, however, well suited for a thruster nozzle.

Figure 2:
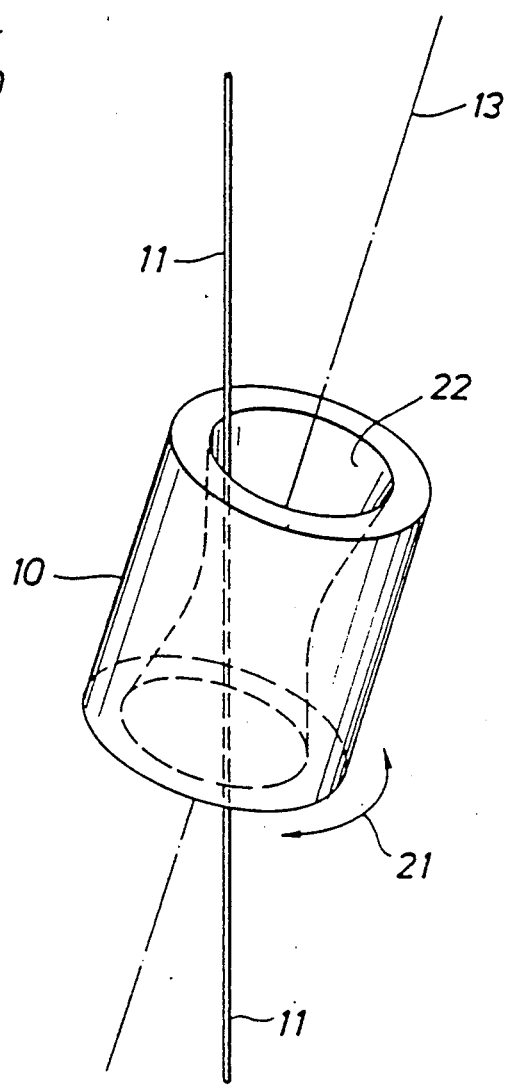
FIG. 2 is a schematic isometric view of the body shown in FIG. 1 after the body has been rotated about its central axis and the central core that has been cut away has been removed.
Figure 3:
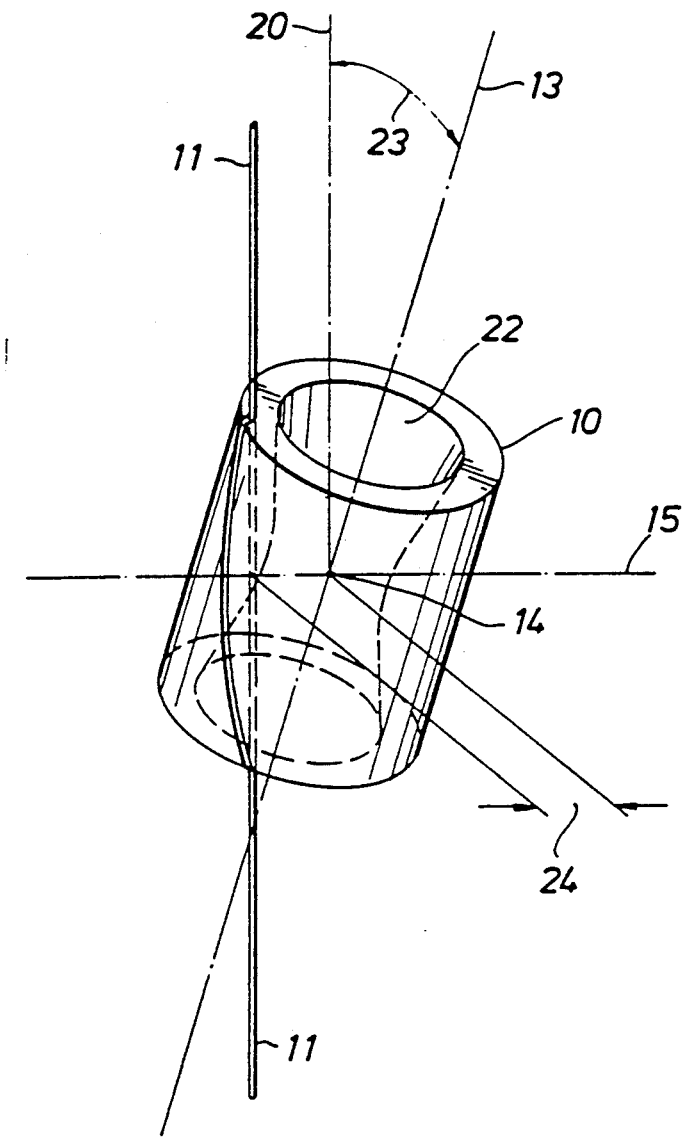
FIG. 3 is a schematic isometric view of the body shown in FIGS. 1 and 2 as it will appear when it has again been tilted at a predetermined skew angle in relation to the longitudinal axis of the EDM electrode which, for the second time, has been initially positioned and arranged outside of the body so as to cooperatively shape the external surface of the body upon the rotation of the body around its central axis.

It will, of course, be recognized by those skilled in the art that with most, if not all, space vehicles it is essential to minimize the overall weight of those vehicles. Accordingly, the external surface of the thruster nozzle body 10 may also be formed into a hyperboloid in the practice of the invention. As shown in FIG. 3, the body 10 is positioned at a desired skew angle 23 in relation to the vertical reference line 20. The body 10 is positioned so as to place its exterior surface in cutting proximity of the EDM electrode wire 11. Then, while the body is maintained in this selected skewed position, the electrode wire 11 is progressively and selectively translated laterally in the X-Y plane to the position shown in FIG. 3 where the EDM electrode is spaced at a predetermined distance 24 from the vertical reference line 24. It will, of course, be understood that the skew angle 23 and lateral spacing 24 do not have to be the same as the skew angle 17 or the lateral spacing 19 previously described. It should also be appreciated that although the reference axes 13 and 15 and the reference point 14 shown in FIG. 3 are the same as those shown in FIGS. 1 and 2, the exterior surface of the body 10 may be shaped by selecting other reference axes and a different reference point.

Once the body 10 and the EDM electrode wire 11 are in their respective positions shown in FIG. 3, the numerical control unit is programmed to revolve the body about its longitudinal axis 13 in a manner similar to that described by reference to FIGS. 1 and 2. Hereagain, the exterior of the body 10 is shaped into an approximate hyperbolic surface of revolution (as depicted at 25 in FIG. 4) which approximates a hyperboloid of one sheet which will deviate slightly from a true hyperbola due to the width of the material removed by the cutting action.

As previously discussed, it is recognized that the overall life of thruster nozzles can be significantly increased by cooling at least a portion of the internal walls of a nozzle during the operation of the thruster rocket. Accordingly, in keeping with the objects of the invention, it is preferred to provide a plurality of circumferentially-spaced channels in the internal walls of the nozzle body 10 through which coolant or liquid rocket fuel will be diverted during its operation. As previously discussed, a typical EDM machine can not be used in the conventional fashion for cutting cooling channels into the walls of a thruster nozzle which will have a closely-controlled spacing between adjacent channels as well as between each of the channels and the internal surface of the nozzle body.

Figure 4:
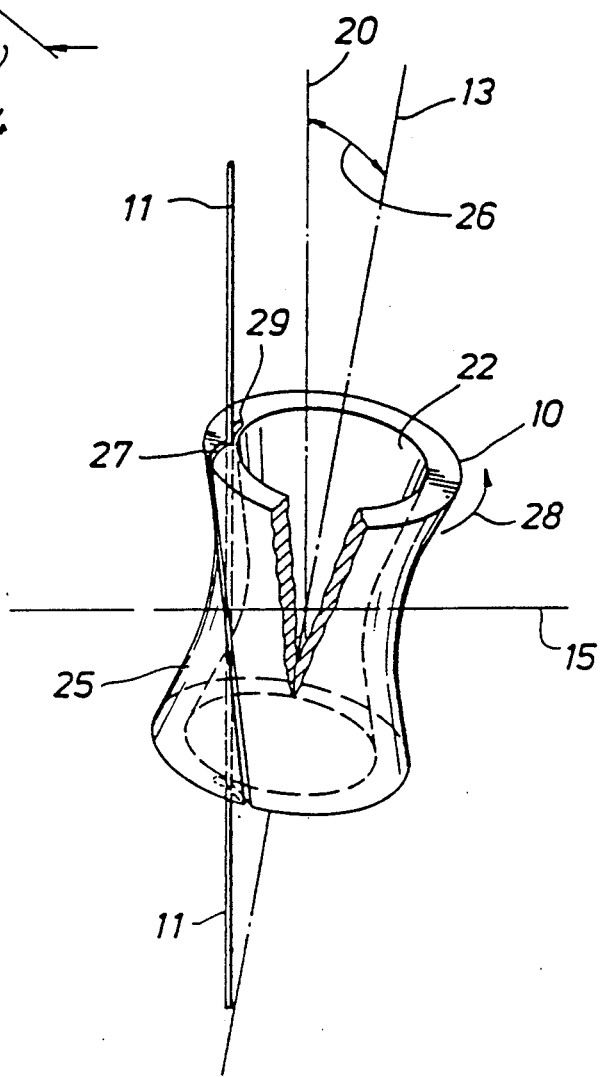
FIG. 4 is a schematic isometric view of the body depicted in FIG. 3 as it will appear after the EDM electrode wire has again been positioned and arranged outside of the body and the body is rotated and laterally translated in relation to the EDM electrode to cooperatively shape elongated grooves or passages in the wall of the body as the body.

Accordingly, as depicted in FIG. 4, the electrode wire 11 is again positioned outside of the nozzle body 10 and the body is again tilted at a predetermined skew angle 26 in relation to the longitudinal reference axis 20. The EDM machine is started and a slot 27 is cut by rotating the nozzle body 10 as shown by the reference arrow 28 around the longitudinal axis 13 while controlling the skew angle 26 and the X-Y position of the EDM electrode wire 11. The slot 27 is made in a predetermined path in the body 10 to provide the electrode wire 11 access to cut a cooling channel or to reduce material stresses within the body or to accomplish both objects. Various conventional methods can also be used to bring the electrode wire 11 to the position shown in FIG. 4. Once the EDM electrode wire 11 reaches this position, a cooling channel 29 is cut by turning the body 10 as required about its axis 13 while again controlling the skew angle 26 and the X-Y position of the wire. The cooling channel 29 formed by this cutting action will have a predetermined varying cross-section, at different positions along the body axis 13, that will generally be of minimum area when the cooling channel is at its closest pass to the body axis (i.e., near the throat of the nozzle body internal contour 22), and be in close controlled proximity to this internal contour of the nozzle along the entire length of the cooling channel.

Figure 5:
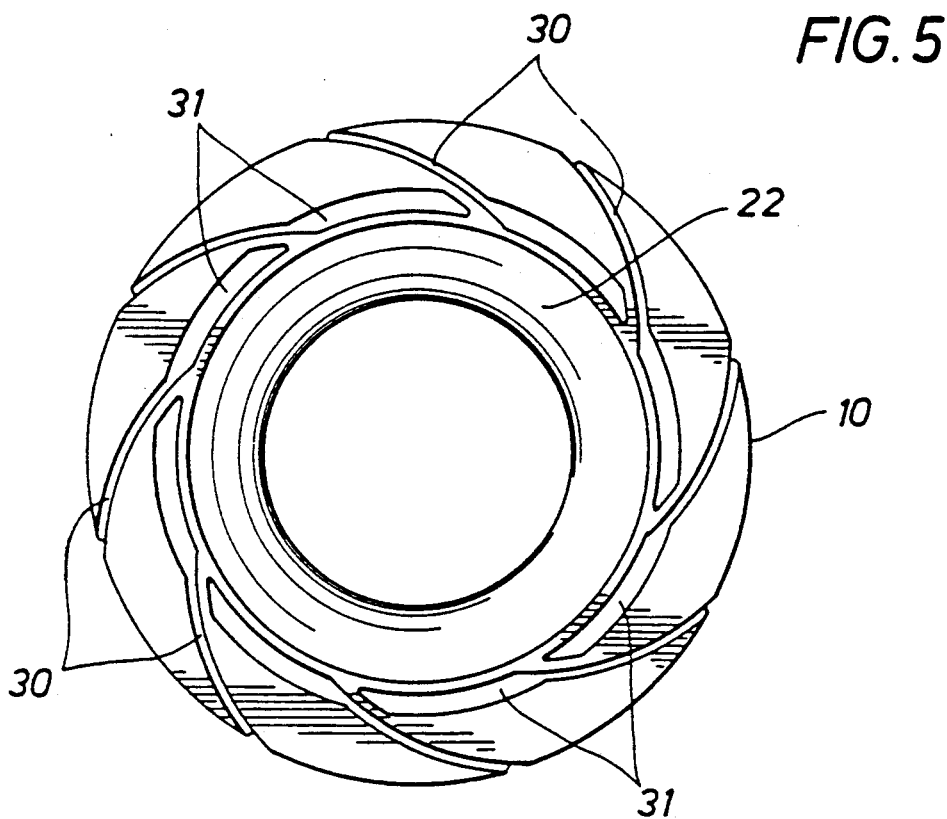
FIG. 5 is a plan view of one end of the body illustrated in FIG. 4 after the body has been laterally translated and skewed in relation to the EDM electrode wire for cooperatively shaping elongated grooves with enlarged terminal portions.
Figure 6:
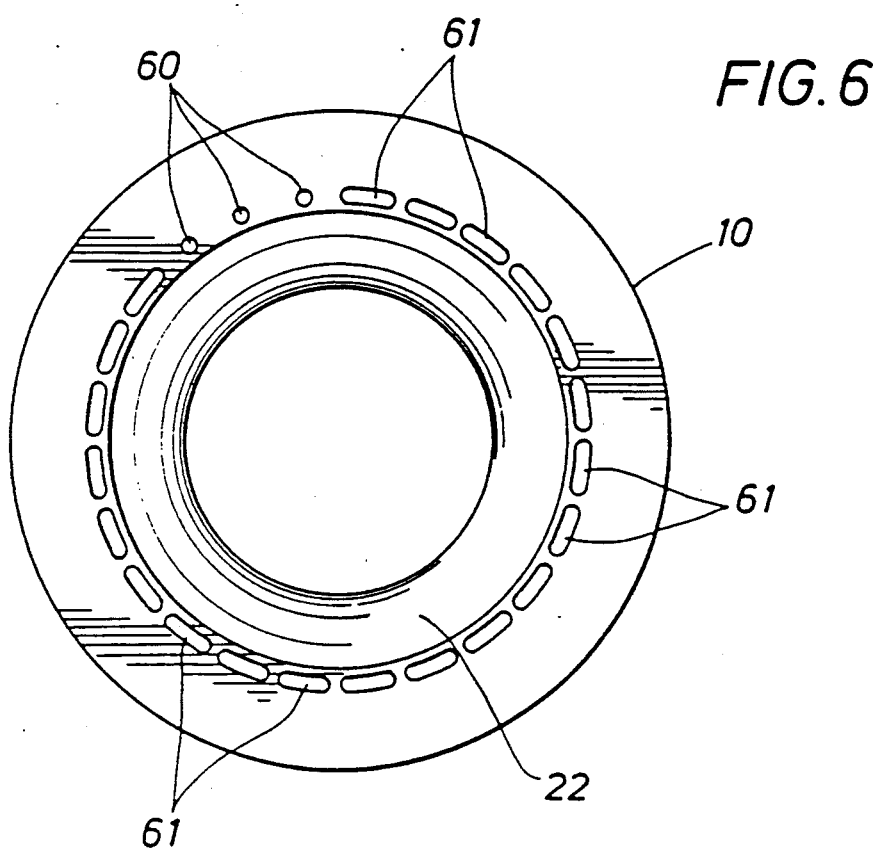
FIG. 6 is a plan view of one end of the body shown in FIG. 4 for depicting the practice of the present invention where a series of pilot holes have been previously formed in the body and elongated passages are cut in the wall of the body by initially positioning the stationary EDM electrode in each of the pilot holes in succession and then rocking the body back and forth in relation to the moving EDM electrode as required for properly shaping the passages.

It will, of course, be appreciated that this technique can be employed for cooperatively shaping a plurality of slots and cooling channels in the wall of the nozzle 10 by progressively turning the nozzle body about the axis 16 to a selected number of uniformly-spaced angular positions; and, at each of these angular positions, laterally translating the EDM electrode 11 in the X-Y plane as previously described above for cutting out a plurality of slots or cooling channels as shown at 30 in FIG. 5 which are respectively terminated by an enlarged end portion as at 31. Once the nozzle 10 has been positioned at each of its angular positions and the operation completed, the cutting action of the EDM wire 11 will have produced a series of these circumferentially-spaced cooling channels 30 and 31 in the wall of the nozzle as required for carrying a portion of the liquid fuel needed to adequately cool the thruster nozzle as well as reduce thermal stresses in the nozzle. It will, of course, be recognized that these slots or channels as at 30 can be produced solely for reducing thermal stresses in the nozzle body 10.

Accordingly, it will be appreciated that the methods of the present invention are particularly adapted for using standard EDM electroerosive machines as well as appropriate devices for controlling the position of the work piece for selectively forming thruster nozzles from blocks of electrically-conductive materials, and to make these nozzles at fabricating costs that are significantly lower than would otherwise be possible with the fabricating techniques used heretofore. It will be further recognized that the present invention also provides a new and improved technique for efficiently cutting elongated channels in the walls of a thruster nozzle and that the channels so formed can be of a configuration and in materials uniquely suited to thruster design and may not be obtainable by means of any other method.

While only particular embodiments of the methods of the present invention have been shown and described herein, it is apparent that various changes and modifications may be made without departing from the principles of the present invention in its broader aspects; and, therefore, the aim in the claims appended hereto is to cover all such changes and modifications as fall within the true spirit and scope of this invention.

What is claimed is:

1. A method for cutting away a selected portion of a body of selected material comprising the steps of:

positioning a selected portion of the body which is to be cut away into cutting proximity of a longitudinally extending cylindrical material removal device, cutting tool, designed to remove the selected material contiguous to its longitudinal surface;

moving the body relative to the longitudinal axis of the material removal device from a first position where a selected axis of the body is parallel to the longitudinal axis of the material removal device to at least a second position where the selected body axis is skewed in relation to the longitudinal axis of the material removal device for producing a cut into the selected body portion that is skewed in relation to the selected body axis; and while the body is retained in its said second position, moving the material removal device relative to the body to a selected position within the body; and while the material removal device is in its said selected position, revolving the body about the selected body axis for cutting an approximately-hyperbolic surface of revolution on the selected body portion.

2. The method of claim 1 wherein the selected portion of the body is an elongated passage extending through the body into which the material removal device is placed and positioned in cutting proximity to the wall of the elongated passage for cutting said surface of revolution within the interior of the body as the body is revolving about the selected body axis.

3. The method of claim 1 wherein the exterior of the body is the selected body portion which is positioned in cutting proximity to the material removal device for cutting said surface of revolution around the exterior of the body as the body is revolving about the selected body axis.

4. The method of claim 1 further including the steps of:

positioning a second portion of the body into cutting proximity to the material removal device and moving the body relative to the material removal device to a position where the selected body axis is skewed in relation to the longitudinal axis of the material removal device for producing a transverse cut into the second body portion that is skewed in relation to the selected body axis.

5. The method of claim 4 wherein the said transverse cut is a predetermined combination and sequence of:

revolving the body about the selected body axis, laterally translating the body relative to the axis of the material removal device and changing the selected body axis skew angle relative to the axis of the material removal device to form a channel through the body that is skewed relative to the selected body axis and approximately parallel to the said hyperbolic surface of revolution.

6. A method for cutting away a portion of a body of selected material comprising the steps of:

positioning a selected portion of the body which is to be cut away into cutting proximity of a cutting device with a generally cylindrical shaped cutting zone designed to remove material from the body contiguous to the boundaries of the cutting zone, where a selected axis of the body is skewed in relation to the axis of the cutting device; and removing material from the body while moving the body relative to the cutting device in a prescribed motion consisting of rotation of the body around the selected body axis to form an approximately hyperbolic surface of revolution on the selected body portion.

7. The method of claim 6 wherein the selected portion of the body is an elongated passage extending through the body into which the cutting device is placed and positioned in cutting proximity to the wall of the elongated passage for cutting said surface or revolution within the interior of the body as the body is revolving about the selected body axis.

8. The method of claim 6 wherein the exterior of the body is the selected body portion which is positioned in cutting proximity to the cutting device for cutting said surface of revolution around the exterior of the body as the body is revolving about the selected body axis.

9. The method of claim 6 further including the steps of:

positioning a second portion of the body into cutting proximity to the cutting device and moving the body relative to the cutting device to a position where the selected body axis is skewed in relation to the longitudinal axis of the cutting device for producing a transverse cut into the second body portion that is skewed in relation to the selected body axis.

10. The method of claim 9 wherein the said transverse cut is a predetermined combination and sequence of:

revolving the body about the selected body axis, laterally translating the body relative to the axis of the cutting device and changing the selected body axis skew angle relative to the axis of the cutting device to form a channel through the body that is skewed relative to the selected body axis and approximately parallel to the said hyperbolic surface of revolution.

11. The method of claim 6 wherein the prescribed cutting device is a water jet.

12. The method of claim 6 wherein the prescribed cutting device is a laser.

13. The method of claim 6 wherein the prescribed cutting device is an abrasive wire.

14. The method of claim 6 wherein the prescribed cutting device is a hot wire.

15. The method of claim 1 where the longitudinally extending cylindrical material removal device is a water jet.

16. The method of claim 1 where the longitudinally extending cylindrical material removal device is a laser.

17. The method of claim 1 where the longitudinally extending cylindrical material removal device is an abrasive wire.

18. The method of claim 1 where the longitudinally extending cylindrical material removal device is a hot wire.

* * * * *